J. R. GAMMETER.
TIRE.
APPLICATION FILED JULY 8, 1911.
1,057,232.
Patented Mar. 25, 1913.
2 SHEETS—SHEET 2.
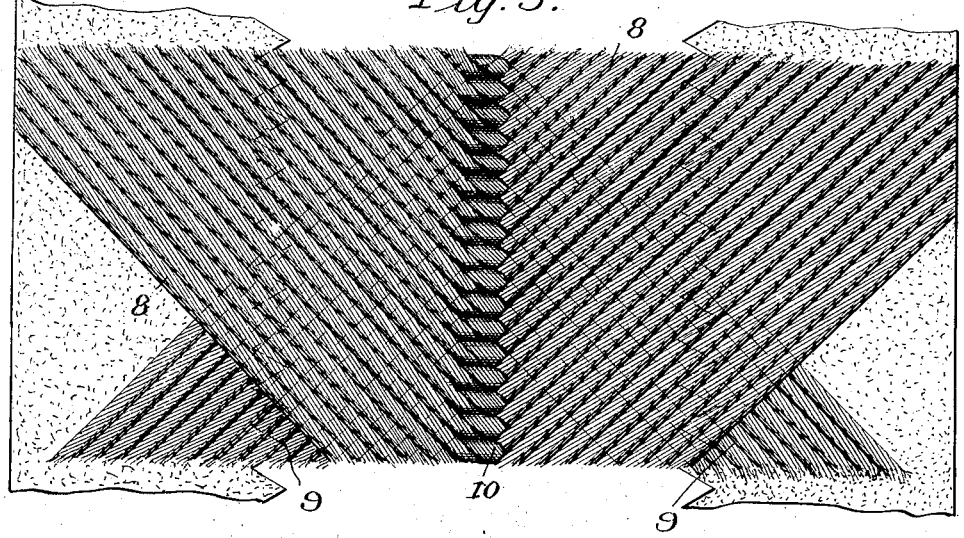
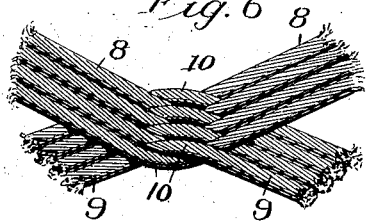

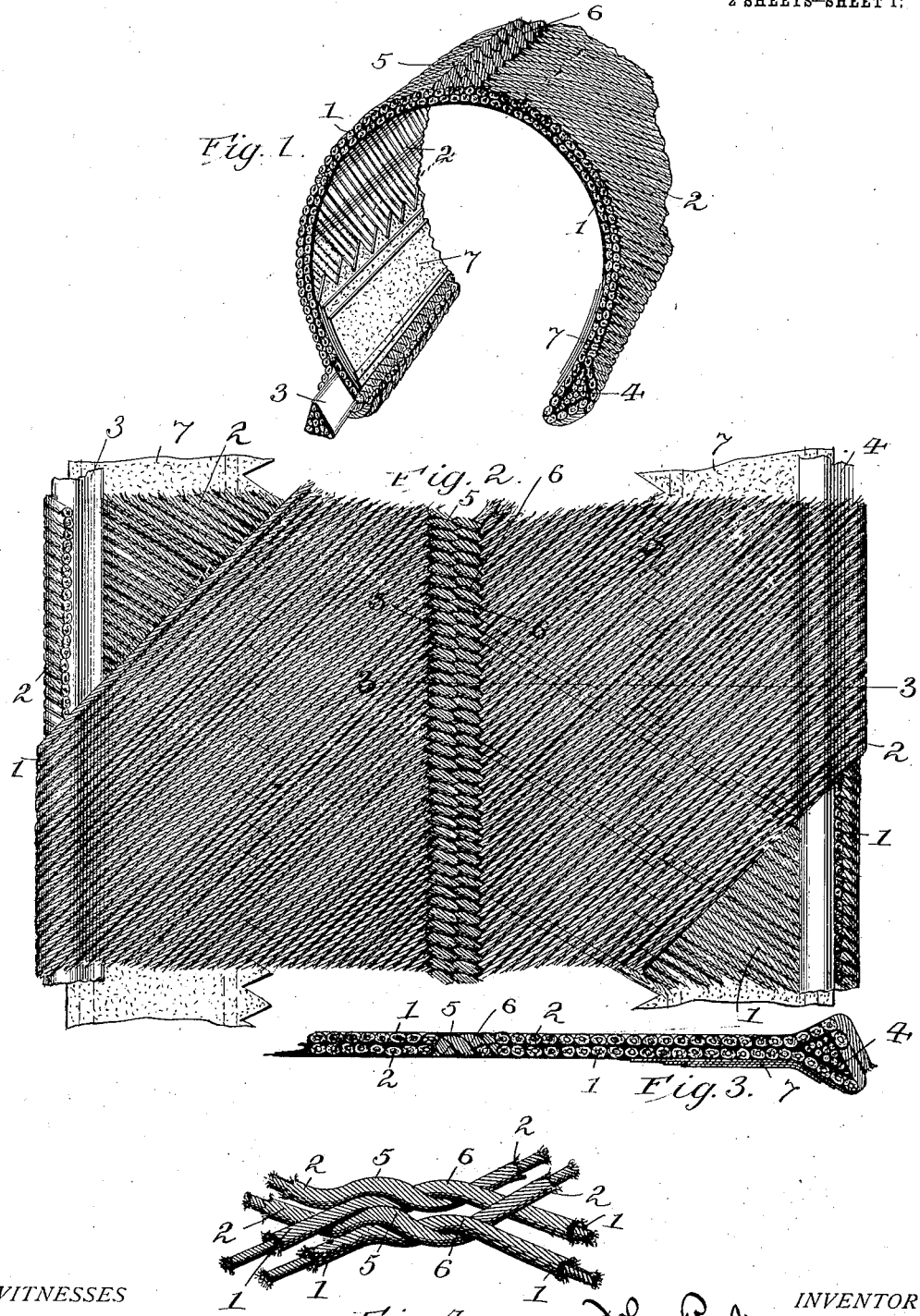

UNITED STATES PATENT OFFICE.

JOHN R. GAMMETER, OF AKRON, OHIO, ASSIGNOR, BY MESNE ASSIGNMENTS, TO THE B. F. GOODRICH COMPANY, OF NEW YORK, N. Y., A CORPORATION OF NEW YORK.

TIRE.

1,057,232.     Specification of Letters Patent.     Patented Mar. 25, 1913.

Application filed July 8, 1911. Serial No. 637,426.

*To all whom it may concern:*

Be it known that I, JOHN R. GAMMETER, a citizen of the United States, residing at Akron, in the county of Summit and State of Ohio, have invented certain new and useful Improvements in Tires, of which the following is a specification.

My present invention pertains to improvements in tires and more particularly to tires of the pneumatic type designed for use in connection with motor vehicles.

As is well understood by those skilled in the manufacture and use of such tires, they are subjected to severe strains and the giving away of a relatively small part or member places undue strain and tension upon the other component elements, resulting in the destruction of the tire, or at least materially shortening the life thereof.

The main object of the present invention relates primarily to the production of a tire wherein the strains and stresses will be the same, or substantially the same, throughout the body thereof, and, furthermore, to building up the tire in such manner that the cords which compose the main body structure will be so positioned, with reference to each other, that they will mutually sustain and brace one another and work together to take up the strains.

As a result of the relative positioning of the cords, as will be hereinafter set forth in detail, there is produced an inextensible tread which insures good driving qualities, the strain being distributed all around the tire, and not localized, which localization places a drag upon that point of the tire which at the moment is resting upon the ground. Again, owing to the interlocking of the cords at the tread and the making of the upper ply to one side of the center the under ply on the other, a further advantage is secured in that there is produced what may be termed a hinge or hinge action at such point which makes the tire ride more easily than would otherwise be the case. Furthermore, this interlocking of the cords tends to equalize the tension upon those cords which may be adjacent to any cord which may give way under strain, or in other words, the added strain due to such mishap is not localized but is evenly distributed throughout an appreciable area adjacent to such disrupted end. Such interlocking will, moreover, unless the disruption takes place immediately at the point of interlocking, maintain or hold the remaining good or unaffected portion of the cord intact in its proper working and effective position with reference to the other cords, and thus it will be seen that the danger from disruption is minimized by half in each cord of the structure.

Some of the forms in which my invention may be embodied are illustrated in the annexed drawings, wherein:

Figure 1 is a perspective view of a section of the tire body, the usual outer layers of relatively heavy rubber or leather, or both, being omitted for the sake of clearness; Fig. 2 a plan view of the outer face thereof, the body being shown as flattened out; Fig. 3 a transverse sectional view on the line 3—3 of Fig. 2; Fig. 4 an enlarged detail view illustrative of the manner in which the cords are interlaced or interlocked at the tread of the tire; Fig. 5 a plan view of a modified form of the invention; and Fig. 6 a detail view of a few of the threads at the tread portion, showing the manner in which they are interlaced.

Referring first to the construction illustrated in Figs. 1 to 4 inclusive, it will be seen that the tire body is composed of a plurality of superimposed layers or plies of cord, two plies in the construction shown; one ply being composed of a series of cords 1, while the other is formed of a series of cords 2. The ends of the cords terminate at the edges or sides of the tire and in the present instance are shown as embracing beads 3 and 4 of any approved type. The cords of each ply, between the edges of the body, or between the beads, may be said to be laid up or positioned so as to assume a Λ-shape, the cords of one ply extending in a direction the reverse of that in the other, with the cords of one ply interlocked with those of the other by interlacing the cords of the various plies at the center or tread portion of the tire. This interlacing is most clearly illustrated in Fig. 4, wherein it will be seen that the cords 1 pass under and then over the corresponding cords 2 (looking from the left to the right of the figure) in line with the center of the tire, the cords 1 throughout that portion of their length to the left of the central interlocked sections (see Figs. 2 and 3) lying above the cords 2, while at the right the reverse position obtains. This interlacing and consequent interlocking of the cords produces at the center line of the tire tread two series of cross loops, bights or deflected portions 5 and 6, which lie in substantial parallelism, and almost at right angles to the longitudinal axis of the tread; and it is such arrangement and disposition of the cords that produce what may be termed a hinge connection between the sides of the tire.

The cords will be laid up close together and rubber cement will preferably be applied thereto as the tire is formed, the cords 1 forming the outer ply at the left of the tire and the under ply at the right, while the reverse is true of the cords 2.

The ends of the cords, or the edges of the plies formed by the cords, will be carried around the beads 3 and 4 in the manner best shown in Fig. 3, the ends of the cords of the outer ply overlying the cords of the inner ply, though, of course, the reverse condition may obtain.

Suitable strengthening strips 7, formed from bias rubber-treated fabric, will be laid upon the inner face of the tire adjacent to the beads, the strips being graduated in width, and the upper edge of the widest strip notched, as at 8, to insure flexibility.

To recapitulate, it will be seen that each cord passes from a bead to the center line of the tread, where it is tied or interlocked with the corresponding cord of the other ply made up of cords oppositely positioned, and then passes to the other bead, which, in effect, means that each cord is divided into two shorter cords or sections each one half the length of the complete cord.

If it be assumed that a cord, starting from one bead and passing at an angle across the tire to the other bead without being interlocked or bent into a Λ-form is twelve inches long, that same cord when interlocked at the center line of the tread becomes in effect two cords, each of which is six inches long. A tire has distinctly greater strength if the cords are short, the fact being that a short cord is less likely to break than a long one. With the present structure there is produced what may be termed a series of short cords or a series of long ends so tied together as to produce a series of interconnected short sections. It follows, therefore, that if one of the cords breaks at one side of the center, the other part or section of that cord which is on the other side of the center line is still in such condition that it will continue to do its work, and the tire is not so much weakened as it would be if the cord extended freely for its full length from side to side of the tire. Again, in order to make a tire as strong as possible, greater care is always devoted to laying the cords in such a way that the various cords are under the same degree of tension, so that all the cords may work together to take up the strains. No matter how carefully the cords are laid, there will be some inequalities in tension, and some cords or strands of fabric will be weaker or have more elasticity than others, so that even if they were originally laid at an equal tension, the tension becomes unequal as the result of the strains and stretching to which they are subjected in use. Now if the cords are made short or subdivided into short sections, as herein set forth, it is easier to lay them under equal tension, and there is less stretch to each cord, so that there is less resulting inequality of tension. And further, the present form has the very marked advantage that the inequality of tension and stretch are better taken up and compensated for than in other tires, because of the fact that one end of each half cord or cord section terminates in the interlocked portion at the center line of the tread which is not an absolute and rigid line, whereas in other tire structures of which I am aware each end of the cord is rigidly held at each bead, so that if a cord stretches it becomes looser as a whole between its two fixed ends.

In the present form of construction, if a cord stretches between a bead and the center line of the tread, because of some difference in quality or other incidental cause, it merely means that the tread, at such portion, tends to become a little more slack, but this slackness is taken up by the various other cords that are pulling at that point in various directions, and the interlocked bights 5 and 6 shift slightly, with the result that the tension of all the cords equalizes and the cords work together again. Thus the present form of construction compensates for inequality or irregularity in placing of the cords in the fabric, and for irregularity in quality or stretch of the cords.

In Figs. 5 and 6 a modification of the invention is illustrated, the main difference residing in the fact that the plies lie in the same plane throughout, that is, the same ply appears as the outer ply to both sides of the tread of the tire, and the other ply remains as the inner or under ply throughout. The outer ply is composed of a series of cords 8, which as in the other form are laid close together in a series of Λs and extend from edge to edge of the tire. The under or inner ply is composed of a similar series of cords 9 laid in a reverse direction to those of the outer ply and crossing the cords thereof at substantially right angles, the cords of the two plies being interlooped, as at 10, at the center of the tread, as clearly shown in Fig. 6. This interlooping of the two series of cords, and the fact that each loop lies close to the adjacent loops and thereby tends to bind the same, produces a fabric similar to the structure before set forth and possessing, though perhaps not to so marked a degree, the various advantages as above set forth.

It will be understood that, as above noted, the cords will be covered with a solution of rubber of the proper consistency, and that the outer body of the tire will be placed on the structure as above produced and the whole cured or vulcanized to form a finished tire.

Having thus described my invention, what I claim is:

1. A tire composed of a series of relatively short cords arranged side by side in a plurality of superimposed plies, the cords extending across the tire at an angle, the cords of one ply being arranged at an angle to those of the other, and the cords of one ply being likewise interlooped and interlocked at the center of the tread portion of the tire with the cords of the other ply, whereby each cord may be said to be subdivided into two sections, and a hinge formed at the tread portion of the tire.

2. In a tire, the combination of two beads; and a body portion interposed between said beads, said body being composed of a plurality of superposed plies, each ply being formed of a series of cords laid side by side in substantially Λ form, and having their ends secured to the beads, the threads of one ply running in a direction the reverse of those of the other ply, with the threads of the two plies interlocked by being interlooped at the center of the tread portion.

3. In a tire, the combination of two beads; and a body portion interposed between said beads, said body being composed of a plurality of superimposed plies, each ply being formed of a series of cords laid side by side in substantially Λ form and having their ends secured to the beads, the cords of one ply being arranged reversely of those of the other, and being interlooped at the center of the tread with the cords of the other ply, the cords of one ply lying outside on one side of said interlooped portion and below upon the other side thereof.

4. In a tire, the combination of a plurality of superimposed plies, each ply being composed of a series of cords laid side by side in substantially Λ form, with the direction of the cords reversed in the adjacent plies, the cords of one ply appearing uppermost to one side of the center of the tire tread, and below upon the opposite side, said cords in passing from one plane to the other being interlooped with the cords of the other ply, whereby an inextensible tread and "hinge" section is produced.

5. A tire composed of a plurality of superimposed plies formed of cords, the cords of each ply being laid side by side, and extending across the tire at an angle, with the cords of the plies interlooped at the center of the tire tread, said looped portions lying crosswise of the tread at substantially right angles thereto.

6. A tire composed of a plurality of plies formed of cords, the cords of the said plies being interlocked only at the center of the tire tread, whereby each cord in effect is subdivided into two sections.

7. A tire composed of a plurality of superimposed cords, said cords being interlocked at their midlength only, the bodies of the cords of one layer and to each side of the interlocked portion extending across the bodies of the other layer at an angle.

8. In a tire, the combination of a pair of beads; and a plurality of superimposed plies, each ply being composed of a series of cords laid up side by side in Λ form, the cords of one ply extending in a direction the reverse of those in the other, the cords of the two plies being interlooped and thereby interlocked at their center, with the cords of one ply appearing uppermost at one side of said interlocked section and innermost at the other side, the normally free ends of the cords being carried around and held in engagement with the beads.

In testimony whereof I have signed my name to this specification in the presence of two subscribing witnesses.

JOHN R. GAMMETER.

Witnesses:
WALTER K. MEHUS,
P. W. AITKEN.